United States Patent Office 3,846,131
Patented Nov. 5, 1974

3,846,131
RECORDING MATERIAL CONTAINING A POLY-HALOGENATED HYDROCARBON PHOTOACTI-VATOR AND A DYE FORMING COMBINATION OF AN INDOLIZINE DERIVATIVE AND AN ALDEHYDE AND THE USE THEREOF
Joachim Werner Lohmann, Wilrijk, Hugo Karel Peeters, Mortsel, Renaat Andreas Ceulemans, Deurne, and Felix Jan Moelants, Wilrijk, Belgium, assignors to Agfa-Gevaert N.V., Mortsel, Belgium
No Drawing. Filed Oct. 19, 1972, Ser. No. 298,830
Claims priority, application Great Britain, Oct. 20, 1971, 48,804/71
Int. Cl. G03c 1/52, 5/24
U.S. Cl. 96—48 R                               22 Claims

ABSTRACT OF THE DISCLOSURE

A photographic process wherein a visible image is formed in a recording material which comprises:
(1) at least one photosensitive organic polyhalogen compound by means of which an acid can be produced,
(2) at least one indolizine derivative and
(3) at least one aldehyde by means of which by exposure to activating electromagnetic radiation a print-out dye image is formed or a latent dye image that is optically developed by an overall photo-exposure. According to a particular embodiment a reactant that is not used up in the dye forming reaction is transferred by heat onto a receiving material in which a dye forming reaction is produced with the transferred reactant. A preferred indolizine derivative is 2-phenyl-3-methyl-indolizine, a preferred aldehyde is p-dimethylaminobenzaldehyde.

---

The invention relates to photographic recording and reproduction of information and to materials suited therefor.

Free radical photography has been described already by R. A. Fotland in J. Phot. Sci., 18 (1970) 33–37.

A typical photosystem, which has been investigated in detail, is comprised of leuco crystal violet, carbon tetra-bromide, triphenylstibine and polystyrene as a binder.

These materials are commercially available but must be carefully handled to prevent the production of a triphenyl-methane dye during the preparation and storage since the leuco dye bases are very oxygen sensitive. This is a real disadvantage for handling the materials before and during exposure and makes it difficult to keep the obtained images completely free from background colouration.

It is an object of the present invention to provide a photographic colour-forming system of the free radical type that offers the possibility to produce photographic materials having a particularly good stability and high photosensitivity.

It is a further object of the present invention to provide photographic materials suited for print-out, optical development, thermal development and positive image formation.

A photosensitive composition has now been found, which is capable of producing directly a visible image as a result of an image-wise modulated exposure to active electromagnetic radiation or radiation of high energy particles and is likewise capable to produce a visible image by the steps of (1) image-wise exposing the recording material to a dose of said radiation sufficient to bring about a latent or barely visible image and (2) subsequently overall heating and/or overall exposing the recording material to light of a wavelength range for which the material is made more sensitive in the image-wise exposure, said composition comprising in admixture:
(1) at least one organic polyhalogen compound of which a halogen containing radical can be separated photolytically by means of which an acid H-X can be produced wherein X is halogen,
(2) at least one indolizine derivative corresponding to the following general formula (I):

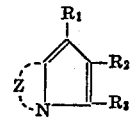

wherein:
Z represents the necessary atoms to close an adjacent 6-membered heterocyclic nitrogen-containing ring having two double bonds or such ring making part of an adjacent polynucleic ring system including said ring or ring system in substituted form,
$R_1$ represents hydrogen or nitro, and
each of $R_2$ and $R_3$ (which may be same or different) represents hydrogen, an alkyl group including a cyclo-alkyl group or substituted alkyl group e.g. aralkyl group such as benzyl, an alkenyl group, an acyl group, a nitro group or an aryl group including a substituted aryl group e.g. phenyl, cyano-substituted phenyl and nitro-substituted phenyl, at least one of the substituents $R_1$ or $R_3$ being hydrogen, and (3) at least one aldehyde or aldehyde derivative of one of the following types:

(i) an aldehyde containing a primary, secondary or tertiary amino group e.g. a dialkylamino group linked by a conjugated system to the aldehyde group,
(ii) a hydroxy-aldehyde in which the hydroxyl group and aldehyde group are linked by a conjugated system and derivatives of said hydroxy-aldehyde in which the hydrogen atom of the hydroxyl group has been replaced by a metal atom or an alkyl group and such derivatives in which the aldehyde group has been masked e.g. as acetal group.

With regard to formula (I) has to be noted that said formula includes the compound in which $R_1$ and $R_2$ together represent the necessary atoms to close an adjacent homocyclic nucleus e.g. a benzene nucleus including these nuclei in substituted form as e.g. described by CH. K. Pradsher, CH. F. Voigt, J. Org. Chem. 36, 1603 (1971).

The following Table 1 contains an illustrative list of suitable compounds according to the general formula (I) with their melting point and a reference for their preparation.

TABLE 1

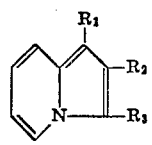

| No. of the compound | R₁ | R₂ | R₃ | Melting point, °C. | Reference for synthesis |
|---|---|---|---|---|---|
| 1 | H | C₆H₅ | CH₃ | 96 | U.K. Pat. specification 658,560. |
| 2 | H | π-CN—C₆H₄ | CH₃ | 181 | Do. |
| 3 | H | CH₃ | H | 58 | J. Chemical Soc. (1946) 1069. |
| 4 | H | C₆H₅ | H | 214 | Do. |
| 5 | H | CH₃ | COCH₃ | 83 | Do. |
| 6 | H | C₆H₅ | COCH₃ | 64 | Do. |
| 7 | H | C₆H₅ | COC₆H₅ | 137 | Do. |
| 8 | NO₂ | CH₃ | H | 154 | J. Chemical Soc. (1946) 1077. |
| 9 | H | CH₃ | NO₂ | 103 | Do. |
| 10 | NO₂ | p-NO₂—C₆H₄ | H | 235 | Do. |
| 11 | H | CH₃ | CH₃ | 36 | Chemical Ber. 60, 1607 (1927). |

In Tables 2, 3 and 4 examples of suitable aldehydes of the type (i) are listed with their melting point and a reference for their synthesis is given.

prepared according to P. Baumgarten, Chem. Ber. 57, 1624 (1924) and

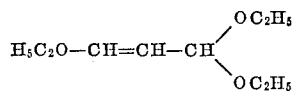

prepared according to R. W. Price, A. Moos, J. Amer. Chem. Soc. 67, 207 (1945).

TABLE 2

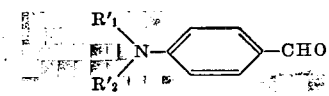

| No. of the compound | R'₁ | R'₂ | Melting point, °C. | Reference for synthesis |
|---|---|---|---|---|
| 1 | CH₃ | CH₃ | 75 | Org. Synth. 33, 27 (1953). |
| 2 | CH₃ | CH₂—CH₂—CN | 72 | Prepared analogously to the preceding reference. |
| 3 | CH₃ | CH₂—COOCH₃ | 72 | Do. |
| 4 | CH₃ | CH₂C(CH₃)₂NO₂O | 98 | Do. |
| 5 | C₂H₅ | 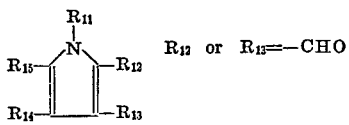 | 173 | Do. |
| 6 | H | H | 71 | Do. |

TABLE 3

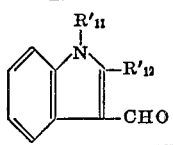

R₁₂ or R₁₃=—CHO

| No. of the compound | R₁₁ | R₁₂ | R₁₃ | R₁₄ | R₁₅ | Melting point, °C. | Reference for synthesis |
|---|---|---|---|---|---|---|---|
| 1 | C₄H₉ | CH₃ | CHO | H | CH₃ | Boiling point, 115° C./0.2 mm. Hg | Prepared analogously to Org. Synth. 36, 74 (1956). |
| 2 | C₆H₅ | CH₃ | CHO | H | CH₃ | 90 | Do. |
| 3 | C₂H₅ | CH₃ | CHO | H | CH₃ | 86 | Do. |

TABLE 4

| No. of the compound | R'₁₁ | R'₁₂ | Melting point, °C. | Reference for synthesis |
|---|---|---|---|---|
| 1 | CH₃ | p-Cl—C₆H₄ | 137 | Prepared analogously to Org. Synth. 36, 74 (1956). |
| 2 | CH₃ | CH₃ | 130 | Do. |

Suitable compounds described under (ii) are e.g.

NaO—(CH=CH)₂—CHO

Suitable organic polyhalogen compounds of which a halogen-containing radical can be photolytically separated are within the scope of the following general formula:

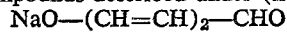

wherein:

each of A, B, X and Y is a halogen atom of the group of chlorine, bromine or iodine, or wherein one of said radicals A, B, X or Y represents an alkyl group, including a substituted alkyl group e.g. a halogen-substituted alkyl radical, a hydroxy-alkyl radical or an aralkyl radical e.g. benzyl, a quinoxaline group, an aryl group, a substituted aryl group or an aroyl group and the other radicals chlorine, bromine or iodine, or wherein at least two of said radicals A, B, X or Y represent an aromatic acyl group e.g. benzoyl and the other radicals chlorine, bromine or iodine.

Particularly suitable representatives falling within the scope of that general formula are organic halides such as carbon tetrabromide, bromoform, iodoform, hexachloroethane, hexabromoethane, pentabromoethane, 1,1,2,2-tetrabromoethane, α,α,α-tribromoacetophenone, tribromoethanol and the 2-tribromomethylquinoxaline compounds described in Belgian Patent Specification 757,145.

Without limiting the scope of the present invention in any way it is assumed that the colour-forming reaction between the indolizine derivative and an aldehyde of the type (i) takes place along the following reaction scheme:

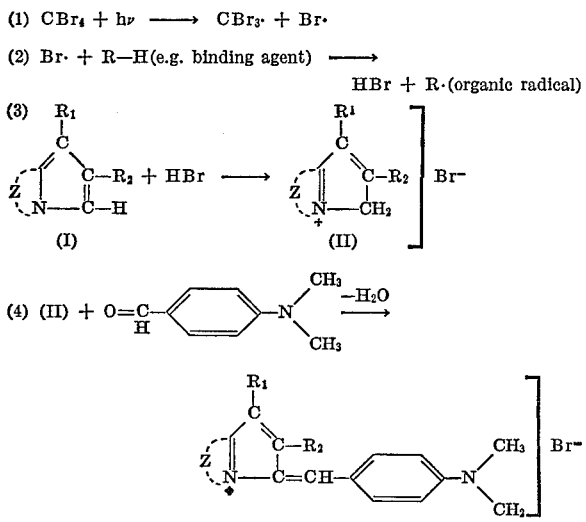

The above cited photosensitive organic polyhalogen compounds are normally only sensitive in a wavelength range between 400 and 250 nm.

The photo-sensitivity of the recording composition of the present invention may be enhanced and spectrally enlarged when used in admixture with a sensitizing compound described in the United Kingdom Patent Application 40,349/71 and Belgian Patent Specification 771,848.

By using organic spectral sensitizing agents, e.g. merocyanines or styryl dye salts that have in their structure a conjugated system of sufficient length, it is possible to extend the spectral sensitivity into the visible light spectrum and even into the infrared.

Particularly suited compounds for sensitizing purposes are N-vinylcarbazole polymers and copolymers which may serve as a binder, Michler's ketone, styryl dye base compounds e.g. 2-(p-dimethylaminostyryl)-quinoline or 4-(p-dimethylaminostyryl)-quinoline and photoconductive zinc oxide.

As a further constituent the photosensitive recording layer according to the present invention may contain a film-forming binder.

Particularly suitable binders for use in the present invention are hydrophobic polymers and copolymers, e.g. containing styrene, vinyl acetate, acrylonitrile, acrylic acid ester, methacrylic acid ester or butadiene units, hydrophobic cellulose derivatives, phenoxy resins or polycondensates of the polyester type, e.g. polycarbonates and binding agents increasing the sensitivity such as polymers containing N-vinylcarbazole units.

The polymers serving as binding agent can be used in a mixture for improvement of the mechanical strength or adhering power of the recording layer to its support.

In order to diminish the rate of spontaneous thermal colour formation over long periods of time as might be encountered during storage of the photographic material and processing of the photographic materials, so-called antifoggants may be added to the photosensitive composition. Suitable anti-foggants include triaryl compounds of group V elements, e.g. triphenylstibine and sterically hindered phenols e.g. 2,6-di-tert.butyl p-cresol. Triphenylstibine and analogous compounds for the purpose of the present invention are described in the United Kingdom Patent Specification 1,071,104.

A dry photographic coating containing the above mentioned ingredients may be formed by dissolving the binding agent(s) in a suitable inert solvent which acts as dispersing or dissolving medium for the other ingredients and which is removed from the coating composition by evaporation so that a solid photographic recording layer on a properly chosen support is left. The supports may be of any kind encountered in silver halide photographic materials, e.g. paper and film.

The recording materials according to the present invention are suited to produce print-out images of different colour according to the combination of indolizine derivative and aldehyde applied.

According to a preferred recording and reproduction process of the present invention the information-wise exposure is carried out in such a way that first a latent image of dye traces is produced, which is then transformed into a visible dye image by means of a so-called optical development.

The optical development proceeds by overall exposing the recording layer containing the latent or barely visible image with visible radiation the wavelength of which lies in the spectral absorption band of the products formed by the image-wise exposure of the mentioned photosensitive composition. It is advantageous to use in the optical development exposure a cut-off filter absorbing all the light corresponding to the wavelength range that is inherently absorbed by the ingredients of the non-previously exposed recording layer.

The image-amplifying effect is markedly speeded up and the image density increased by applying heat during the optical development.

According to an alternative embodiment of the optical development technique the recording material is first overall exposed to electromagnetic radiation in order to produce non-differentially over the whole recording layer latent dyestuff centres that afterwards are optically developed information-wise.

According to another preferred recording and reproduction process of the present invention the information-wise exposure to active electromagnetic radiation is carried out in such a way that first a latent image is obtained. Subsequently the latent image is developed or intensified to a visible image by overall heating the recording layer so that we may speak of a thermal development.

The information-wise exposure applied in the present invention may be of the transmission or reflex type.

Suitable light sources for use in the image-wise exposure of the recording materials of the present invention are ultra-violet radiation sources, xenon lamps, incandescent bulbs, daylight and flash lamps. In the overall exposure for the optical development an infrared-lamp emitting also in the visible spectrum is preferably used.

The obtained negative prints may be stabilized by washing out the residual free radical generator with a suitable solvent or solvent mixture, e.g. a hydrocarbon liquid such as petroleum ether optionally mixed with acetone, or—if the compound involved is sufficiently volatile—by simply evaporating it by raising the temperature. For the latter purpose and the high photo-sensitivity, carbon tetrabromide or a mixture of carbon tetrabromide and iodoform is preferred.

It is an important property of the recording materials of the present invention that they are suited for producing positive prints by transfer of at least one non-reacted dye precursor.

According to that technique the recording sheet is first image-wise exposed to the already mentioned active radiation in order to effect the coupling of the colour-forming substances. At least one of the colour-forming substances left in the unexposed or less exposed portions is transferred by heat to a receptor sheet on which a positive colour image is obtained by a subsequent chemical reaction involving the transferred compound(s).

This latter technique has the advantage that the final copy is not photosensitive, since the colour-forming substance(s) has (have) been used up in the exposed parts in the photosensitive sheet and on the receiving sheet in accordance with the non-exposed parts of the recording sheet. Consequently no image-stabilization has to be applied.

The present two-sheet system is analogous to the system of Workman described in the United States Patent Specification 3,094,417 in which a photosensitive reductor susceptible of being deactivated by exposure to short wavelength radiation is used. By using heat the remaining reductor is transferred to a sheet in which it effects a colour-forming redox reaction.

According to one embodiment of the present transfer system, only one of the components, either the indolizine derivative or the aldehyde is transferred to the receiving sheet. This is possible by selecting the components in such a way that they have a sufficiently large difference in diffusion mobility or volatility whereby one of them can be transferred by applying heat to the receiving sheet without mobilizing the other component. The transferred component is allowed to react on the receiving sheet with (a) suitable reaction partner(s) that need not be of the same type as the one(s) present in the photo-sensitive sheet.

According to another embodiment all partners of the colour forming reaction of the photosensitive sheet are transferred by heat to the receiving sheet, which contains preferably an acid of low volatility that is strong enough to bring about the dye-forming reaction between the indolizine derivative and the aldehyde.

The acid is preferably incorporated into a binder through which the evaporated reaction partner(s) can penetrate.

The photosensitive recording materials of the present invention are very versatile in that they can be applied for continuous tone or halftone reproduction. They can offer very contrasty images so that they are very suited for the reproduction of line and screen type originals and find a successful use in a great variety of graphic art applications. Due to the very high resolving power of the recording materials (the dyestuffs are formed in molecularly divided form) the recording materials of the present invention are particularly suited for microfilm reproduction and high precision image rendering as e.g. in the production of optical micromask masters used in the manufacturing of microelectronic circuitry.

The reflex-exposure properties of the present recording materials combined with the transfer technique make them very useful in the document reproduction field since positive copies of opaque originals can be obtained.

A recording material of the present invention can be used in X-ray, laser beam and electron-beam recording. For the purpose of X-ray recording the recording materials preferably contain high energy absorbing substances yielding so-called secondary photons, e.g. of the ultra violet radiation energy band, and photo-electrons that are absorbed by the photosensitive polyhalogen compound. Such substances preferably contain the elements lead, mercury, bismuth, barium and/or tungsten.

The colour-forming mixture of indolizine derivative(s) and aldehyde(s) is preferably used in admixture with a 1- to 20-fold amount by weight of photosensitive organic halogen compound such as carbon tetrabromide.

This ratio is, however, not limitative since useful results can be obtained e.g. with the colour-forming mixture and photosensitive polyhalogen compound in a ratio by weight in the range of 2:1 to 1:50.

Preferred recording layer compositions of the present invention contain a mixture of an indolizine derivative and aldehyde compound in combination with poly-N-vinylcarbazole in a ratio by weight within the range of 80:100 to 10:100 and a photosensitive polyhalogen compound such as carbon tetrabromide or iodoform or a mixture of both said polyhalogen compounds with respect to poly-N-vinylcarbazole in a ratio by weight in the range of 160:100 to 20:100.

Such recording layer composition comprises preferably an anti-fogging agent e.g. triphenylstibine.

A preferred weight ratio of anti-fogging agent such as triphenylstibine to photosensitive carbon tetrabromide and/or iodoform is within the range of 1:100 to 2.5:100.

The present invention is illustrated by the following examples. The percentages are by weight unless otherwise indicated.

Example 1

A photosensitive composition consisting of:

50 mg. of 2-phenyl-3-methyl-indolizine,
50 mg. of p-dimethylamino-benzaldehyde,
100 mg. of carbon tetrabromide,
100 mg. of iodoform,
150 mg. of triphenylstibine,
20 mg. of Michler's ketone, and
10 ml. of a 10% solution of polyvinylcarbazole in methylene chloride was coated at a thickness of 0.1 mm. onto an unsubbed polyethylene terephthalate support and dried. The layer was exposed through a grey wedge (constant 0.15) in an UV-exposure apparatus (Actina SH, sold by La Cellophane, Paris) for 20 sec. and heated to 150° C. for 30 sec. A stable negative cyan image showing 13 steps was obtained.

Example 2

The photosensitive layer of example 1 was exposed for 30 sec. in reflex contact to an opaque original being a black printed text on a white paper. The exposure was carried out by means of the 3M 179 contact printer processor (sold by Minnesota Mining and Manufacturing Co., St. Paul, Minn., U.S.A.), the visible light of which was filtered by a yellow cut-off filter L 519 sold by Agfa-Gevaert AG, West-Germany. The temperature of the exposure plate in the printer amounted to about 60° C. during exposure.

A sharp negative image of the original was obtained which could be stabilized by heating it to 150° C. for 30 sec.

Example 3

A photosensitive composition consisting of:

50 mg. of 2-phenyl-3-methyl-indolizine,
50 mg. of p-dimethylamino-benzaldehyde,
100 mg. of carbon tetrabromide,
100 mg. of iodoform,
150 mg. of triphenylstibine,
20 mg. of 2-(p-dimethylaminostyryl-quinoline), and
10 ml. of a 10% solution of polystyrene in methylene chloride was coated at a thickness of 0.1 mm. onto a non-subbed polyethylene terephthalate support and dried. The layer was exposed to UV-radiation through a grey wedge under the conditions of Example 1. After stabilization a negative brown image showing 12 steps was obtained.

This layer was exposed in reflex contact to an opaque original under the conditions of Example 2. A good negative image of the original was obtained.

Example 4

A photosensitive composition consisting of:

50 mg. of 2-phenyl-3-methyl-indolizine,
50 mg. of p-dimethylamino-benzaldehyde,
200 mg. of carbon tetrabromide,
10 ml. of a 10% solution of polystyrene in methylene chloride was coated at a thickness of 0.1 mm. on a non-subbed polyethylene terephthalate support and dried.

This layer was exposed through a grey wedge (constant 0.15) to visible light in a 3M 179 contact printer-processor for 5 sec. The latent image thus obtained was developed by overall exposure for 20 sec. to light from a Philips infra-red lamp (sold by Philips' Gloeilampenfabrieken N.V., The Netherlands, as type 13 344 E/44 of 375 W) placed at a distance of 20 cm. and filtered through a cutoff filter absorbing all light of wavelength smaller than 540 nm. The blue image formed was stabilized by heating to 170° C. for 30 sec. The image showed 14 steps (12 steps prior to stabilization).

Example 5

A mixture consisting of:

50 mg. of 1,2-diphenyl-indolizine
50 mg. of N-ethyl-2,5-dimethyl-pyrrolaldehyde (3)
200 mg. of carbon tetrabromide
10 ml. of a 10% solution of polystyrene in methylene chloride was coated at a thickness of 0.1 mm. onto a polyethylene terephthalate support and dried. Exposure of this layer to visible light through a grey wedge (const. 0.15) as in Example 4 yielded a latent image which was developed thermally to a visible image by heating to 180° C. for 30 sec. The magenta image showed 8 steps.

Example 6

A receiving sheet was prepared from a composition of 100 mg. of 2,4-dimethyl-benzene sulphonic acid and 10 ml. of a 10% solution in methylene chloride of cellulose acetatebutyrate coated at a thickness of 0.1 mm. on a map overlay tracing paper and dried.

Non-stabilized negative images obtained according to Example 1 (but applying a 5 sec. UV-exposure), to Example 2, to Example 4 and to Example 5 (but applying a 10 sec. thermal development) were pressed to said receiving sheet at 100° C. for 25 sec. in a 3M 179 contact printer-processor. Positive images of the same colour as the corresponding negatives were produced. Each negative yielded 1 to 5 positives depending on the compounds used. The multitransfer of the colour forming substances yielded of course images of decreasing spectral density but still sufficiently readable.

Example 7

A receiving sheet (A) was prepared by coating a map overlay tracing paper at a thickness of 0.1 mm. with the following composition:

100 mg. of 2,4-dimethyl benzene sulphonic acid
100 mg. of N-methyl-2(p-chlorphenyl)-indolaldehyde(3) and
10 ml. of a 10% solution in methylene chloride of cellulose acetatebutyrate and dried.

A receiving sheet (B) was prepared in an analogous way but comprising 100 mg. of p-dimethylamino benzaldehyde instead of the indolaldehyde.

A photosensitive layer was obtained from a mixture of 50 mg. of 2-phenyl-3-methyl-indolizine
50 mg. of N - ethyl-N-[β-(o-sulphobenzoic-acid-imidyl)-ethyl]-p-aminobenzaldehyde
200 mg. of carbon tetrabromide and
10 ml. of a 10% solution of methylene chloride of polystyrene coated at a thickness of 0.1 mm. on a polyethylene terephthalate support and dried.

This photosensitive layer was exposed through a transparency to UV-light for 20 sec. according to Example 1. The negative formed was first brought into contact with the receiving sheet (A) according to the procedure of Example 6, and then contacted with the receiving sheet (B).

On receiving sheet (A) a positive magenta image of the original was produced, whereas on receiving sheet (B) a positive blue image of the original was obtained.

We claim:

1. A photographic process for forming a visible image in a recording material which comprises in intimate admixture:

(1) at least one organic polyhalogen compound corresponding to the following general formula:

wherein:
    each of A, B, X and Y is chlorine, bromine and iodine, or one of A, B, X or Y represents an alkyl group, an aryl group or an aroyl group and the others represent chlorine, bromine or iodine, or at least two of A, B, X or Y represent an aromatic acyl group and the others represent chlorine, bromine or iodine, and (2) at least one indolizine derivative corresponding to the following general formula:

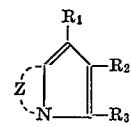

wherein:
    Z represents the necessary atoms to close an adjacent pyridyl nucleus,
    $R_1$ represents hydrogen or nitro,
    each of $R_2$ and $R_3$ represents hydrogen, an alkyl group, an aralkyl group, an alkenyl group, an acyl group, a nitro group or a phenyl group, at least one of $R_1$ or $R_3$ being hydrogen, and (3) at least one aldehyde compound of one of the following general formulae:

(a) 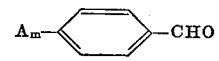

wherein:
    Am represents a primary, secondary, or tertiary amino group, (b) 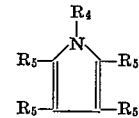

wherein:
    one $R_5$ group is —CHO and each remaining $R_5$ and $R_4$ is hydrogen, an alkyl group, or a phenyl group, (c) 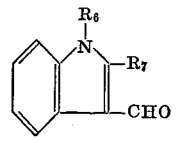

wherein:
R₆ is an alkyl group and
R₇ is an alkyl group or a phenyl group, (d)     ZO—(CH=CH)ₙ—Ald wherein:
Z is hydrogen, a metallic atom or an alkyl group,
n is an integer of at least one, and
Ald is —CHO or —CH(OR₈)₂ where R₈ is an alkyl group, said visible image being formed by the steps of:
imagewise exposing the recording material to active electromagnetic radiation of a dose being sufficient to bring about a directly visible image, or by the steps of:
imagewise exposing the recording material to active electromagnetic radiation of a dose sufficient to create therein an at most barely visible image which has a spectral sensitivity in a wavelength range outside the inherent sensitivity range of the organic polyhalogen compound, and overall exposing the imagewise exposed recording material to heat or light within the wavelength range to which the initially exposed portions were made more sensitive than the initially non-exposed portions, to thereby increase the visibility of said image, or by the steps of:
overall exposing the recording material to electromagnetic radiation of a dose sufficient to bring about in the recording material an increase in spectral sensitivity in a wavelength range outside the inherent sensitivity range of the polyhalogen compound, and imagewise exposing the overall exposed recording material within the wavelength range for which the overall exposed recording material was made more sensitive in order to form a visible image corresponding with said imagewise exposed portions.

2. A process according to claim 1, wherein the recording material after the formation of a visible image is uniformly heated to bring about intensification and stabilization of said image.

3. A photographic process according to claim 1, wherein the recording material after the formation of a visible image is treated with a solvent for washing out the residual organic halogen compound.

4. A photographic process according to claim 1, wherein said polyhalogen compound is carbon tetrabromide, iodoform or a 2-tribromomethylquinoxaline or mixtures thereof.

5. A photographic process according to claim 1, wherein said mixture is used in combination with a sensitizing compound.

6. A photographic progress according to claim 5, wherein said mixture is used in combination with poly-N-vinylcarbazole or a copolymer containing N-vinylcarbazole units.

7. A photographic process according to claim 5, wherein said mixture is used in combination with Michler's ketone, a styryl dye base or photoconductive zinc oxide.

8. A process according to claim 1, wherein the recording material in combination with said mixture contains as antifogging agent a sterically hindered phenol and/or a triaryl compound of a group V element.

9. A process according to claim 1, wherein the mixture is used in one or more binding agents selected from the group of polymers and copolymers comprising styrene, vinyl acetate, acrylonitrile, acrylic acid ester, methacrylic acid ester, N-vinylcarbazole or butadiene units, a hydrophobic cellulose derivative, a phenoxy resin or a polycondensate of the polyester type including a polycarbonate resin.

10. A process according to claim 1, wherein the imagewise exposure is effected by means of X-rays and substances are present in the recording material to absorb high energy radiation and produce secondary photons and photoelectrons when struck by X-ray radiation.

11. A process according to claim 1, wherein the imagewise exposure is effected by means of an imagewise modulated electron beam or laser light beam.

12. A photosensitive recording material which contains an intimate mixture comprising:
(1) at least one organic polyhalogen compound corresponding to the following general formula:

wherein:
each of A, B, X and Y is chlorine, bromine and iodine, or one of A, B, X or Y represents an alkyl group, an aryl group or an aroyl group and the others represent chlorine, bromine or iodine, or at least two of A, B, X or Y represent an aromatic acyl group and the others represent chlorine, bromine or iodine, and (2) at least one indolizine derivative corresponding to the following general formula:

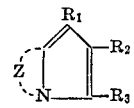

wherein:
Z represents the necessary atoms to close an adjacent pyridyl nucleus,
R₁ represents hydrogen or nitro,
each of R₂ and R₃ represents hydrogen, an alkyl group, an aralkyl group, an alkenyl group, an acyl group, a nitro group or a phenyl group, at least one of R₁ or R₃ being hydrogen, and (3) at least one aldehyde compound of one of the following general formulae:

(a)     

wherein:
Am represents a primary, secondary, or tertiary amino group, (b)     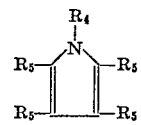

wherein:
one R₅ group is —CHO and each remaining R₅ and R₄ is hydrogen, an alkyl group, or a phenyl group, (c)     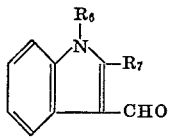

wherein:
R₆ is an alkyl group and
R₇ is an alkyl group or a phenyl group (d)     ZO—(CH=CH)ₙ—Ald wherein:
Z is hydrogen, a metallic atom or an alkyl group,
n is an integer of at least one, and
Ald is —CHO or —CH(OR₈)₂ where R₈ is an alkyl group.

13. A photosensitive recording material according to claim 12, containing at least one of the indolizine derivatives of Table 1.

14. A photosensitive recording material according to claim 1, containing at least one of the aldehyde compounds of Tables 2 to 4.

15. A photosensitive recording material according to claim 12, wherein said polyhalogen compound is carbon tetrabromide, iodoform or a 2-tribromomethyl quinoxaline or mixtures thereof.

16. A photosensitive recording material according to claim 12, wherein the recording material in addition to said mixture contains a sensitizing compound.

17. A photosensitive recording material according to claim 16, wherein the recording material in addition to said mixture contains poly-N-vinylcarbazole or a copolymer containing N-vinylcarbazole units.

18. A photosensitive recording material according to claim 12, wherein said mixture is used in combination with Michler's ketone, a styryl dye base or photoconductive zinc oxide.

19. A photosensitive recording material according to claim 12, wherein said material contains said mixture in combination with a sterically hindered phenol and/or a triaryl compound of a group V element.

20. A photosensitive recording material according to claim 12, wherein the recording material contains a high energy absorbing substance producing secondary photons and photoelectrons when struck by X-ray radiation.

21. A photosensitive recording material according to claim 12, wherein the recording material contains the mixture of compounds (1) and (2) in admixture with a 1 to 50-fold amount by weight of photosensitive organic polyhalogen compound.

22. A photosensitive recording material according to claim 17, wherein the recording material contains the mixture of compounds (1) and (2) and poly-N-vinylcarbazole in a ratio by weight within the range of 80:100 to 10:100.

References Cited
UNITED STATES PATENTS

| | | | |
|---|---|---|---|
| 3,164,467 | 1/1965 | Sprague et al. | 96—90 R |
| 3,489,568 | 1/1970 | Hackmann et al. | 96—90 R |
| 3,486,898 | 12/1969 | Wainer | 96—90 R |

RONALD H. SMITH, Primary Examiner

W. H. LOUIE, JR., Assistant Examiner

U.S. Cl. X.R.

96—48 QP, 48 HD, 90 R; 250—220 R

UNITED STATES PATENT OFFICE
CERTIFICATE OF CORRECTION

Patent No. 3,846,131             Dated November 5, 1974

Inventor(s) Joachim Werner LOHMANN et al

It is certified that error appears in the above-identified patent and that said Letters Patent are hereby corrected as shown below:

Column 12, Claim 14, line 74, change "claim 1" to -- claim 12 --.

Signed and sealed this 14th day of January 1975.

(SEAL)
Attest:

McCOY M. GIBSON JR.
Attesting Officer

C. MARSHALL DANN
Commissioner of Patents